United States Patent [19]

Landauer et al.

[11] Patent Number: 5,301,109

[45] Date of Patent: Apr. 5, 1994

[54] COMPUTERIZED CROSS-LANGUAGE DOCUMENT RETRIEVAL USING LATENT SEMANTIC INDEXING

[75] Inventors: Thomas K. Landauer, Summit; Michael L. Littman, Somerset, both of N.J.

[73] Assignee: Bell Communications Research, Inc., Livingston, N.J.

[21] Appl. No.: 734,291

[22] Filed: Jul. 17, 1991

Related U.S. Application Data

[63] Continuation-in-part of Ser. No. 536,029, Jun. 11, 1990, abandoned.

[51] Int. Cl.⁵ .............................................. G06F 15/40
[52] U.S. Cl. ............................ 364/419.19; 364/419.16
[58] Field of Search ............................................ 364/419

[56] References Cited

U.S. PATENT DOCUMENTS

| | | |
|---|---|---|
| 4,270,182 | 5/1981 | Asija ................................... 364/900 |
| 4,593,356 | 6/1986 | Hashimoto et al. ................ 364/419 |
| 4,654,798 | 3/1987 | Taki et al. ........................... 364/419 |
| 4,839,853 | 6/1989 | Deerwester et al. ............... 364/900 |
| 4,864,503 | 9/1989 | Tolin ................................... 364/419 |
| 4,916,614 | 4/1990 | Koji et al. ........................... 364/900 |
| 5,128,865 | 7/1992 | Sadler ................................. 364/419 |

Primary Examiner—Roy N. Envall, Jr.
Assistant Examiner—Xuong Chung
Attorney, Agent, or Firm—Leonard Charles Suchyta; Joseph Giordano

[57] ABSTRACT

A methodology for retrieving textual data objects in a multiplicity of languages is disclosed. The data objects are treated in the statistical domain by presuming that there is an underlying, latent semantic structure in the usage of words in each language under consideration. Estimates to this latent structure are utilized to represent and retrieve objects. A user query is recouched in the new statistical domain and then processed in the computer system to extract the underlying meaning to respond to the query.

8 Claims, 3 Drawing Sheets

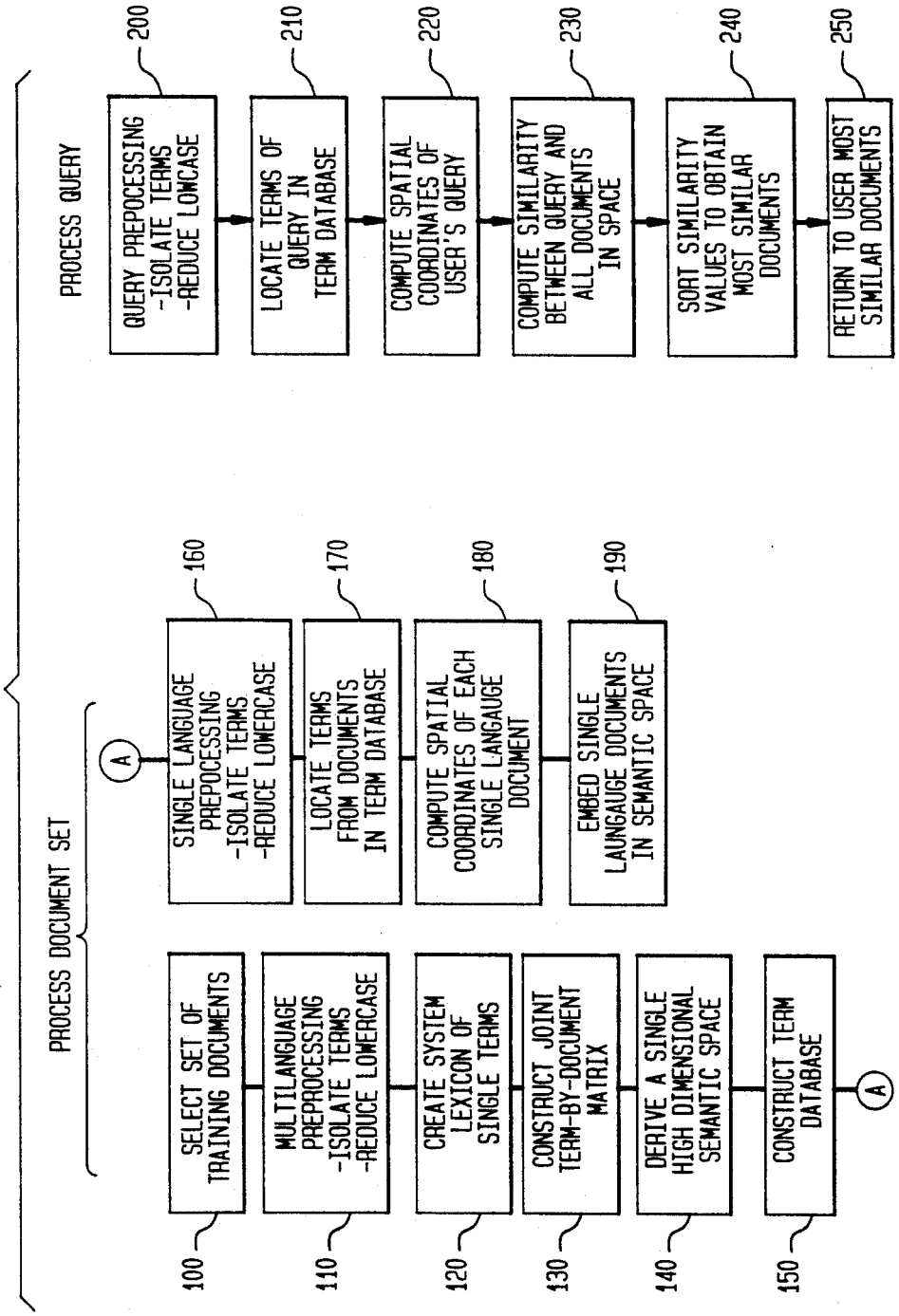

COMPUTERIZED CROSS-LANGUAGE DOCUMENT RETRIEVAL USING LATENT SEMANTIC INDEXING

CROSS-REFERENCE TO A RELATED APPLICATION

This is a continuation-in-part of application Ser. No. 07/536,029, filed Jun. 11, 1990 now abandoned.

FIELD OF THE INVENTION

This invention relates generally to computer-based information retrieval and, in particular, to user accessibility to and display of textual material stored in computer files utilizing a request in one language to retrieve documents in other languages related to the request.

BACKGROUND OF THE INVENTION

In the field of information retrieval, a long-standing objective has been the development of an automated procedure by which documents in one language could be effectively accessed by requests in another language without needing to translate either the documents or the requests. Among other things, such a capability would allow users to determine what documents were available in languages that the users could not read before incurring the expense and delay of translation.

One technique representative of some previously proposed procedures, disclosed in an article entitled "Automatic Processing of Foreign Language Documents," was published by G. Salton in 1970 in the *Journal of American Society for Information Sciences*. Salton reported experimenting with a method for automatic retrieval of documents in one language in response to queries in another using a vector representation and search technique in conjunction with a manually created dual-language thesaurus. The results for test samples of abstracts and queries were promising. However, creating an adequate multi-language thesaurus is difficult and requires considerable intellectual labor. Moreover, a traditional thesaurus necessarily imposes a discrete and rather restricted model of the languages in question and of their relation to one another.

U.S. Pat. No. 4,839,853, issued to one of the present co-inventors and assigned to the same assignee as is the present invention, utilizes the Latent Semantic Indexing (LSI) approach to model the underlying correlational structure of the distribution of terms in documents. Instead of representing documents and queries directly as sets of words, the LSI technique represents them as parameters in such a way that dependencies between words and between documents are taken into account. For example, if two terms are used in exactly the same contexts, that is, have identical distribution across a target collection of documents, LSI is designed to treat them not as two independent indexing entries but as two instances of an abstract indexing variable with the same vector value. Lesser and more indirect relations between terms and between documents are represented in an appropriate analogous fashion.

In the implementation of LSI as set forth in the above-identified patent, the modeling is accomplished by approximating the original term-by-document matrix by the product of three lower rank matrices of orthogonal derived indexing variables. The first matrix represents *terms* as values on a smaller set of independent "basis" vectors; the second matrix contains scaling coefficients; and the third matrix represents *documents* as values on the smaller set of basis vectors. The method can be interpreted geometrically as a means by which each document and each term is assigned to a point in a hyperspace. The mathematics and implementation of the method construct a derived space in which terms, documents, and queries can all be represented in the hyperspace. The mathematical procedure employed is singular value decomposition (SVD), which is closely related to factor analysis and eigenvalue decomposition.

The retrieval process is the same as in standard vector methods, e.g. using document-query cosines as the similarity measure. Various preprocessing steps, such as term weighting, may also be done in standard ways. The principal difference between LSI and previous vector models as represented by the work of Salton is that the vectors are constructed in a space with many fewer dimensions than the number of original terms, and that these dimensions are the subset of linearly independent basis vectors by which the original term-by-document matrix can be best approximated in a least squares sense. The number of dimensions retained has been determined empirically; optimal retrieval performance has usually been obtained with about 100 dimensions for collections of many hundreds to several thousands of documents.

The dimension reduction step of LSI has the advantageous property that small sources of variability in term usage are dropped and only the most important sources kept. Among other things, this can cause synonyms or near synonyms to be collapsed into similar vector representations, with the result that queries can retrieve similar documents even though they share no terms. This cannot happen in the usual raw term vector representation, necessitating manually constructed thesauri with their attendant problems.

The LSI method has previously been applied only within a single language, and there has been no teaching or suggestion in the art regarding the application of LSI to multi-language information retrieval.

SUMMARY OF THE INVENTION

These shortcomings as well as other deficiencies and limitations of conventional information retrieval techniques are obviated, in accordance with the present invention, by constructing a multi-language semantic space. This is effected automatically, without the need for a thesaurus, by modeling the usage of terms in documents using an expanded latent semantic indexing framework. In the broad aspect of the method, an initial set of documents, from a usually larger set of documents, is translated into the number of languages under consideration and the documents, including all translations, are stored in a computer information file; this produces a set of multiple (dual in one special but significant case) language documents. This set of multi-lingual documents is used to "train" an automatic multi-lingual indexing system by processing a joint term-by-document matrix of data. The joint matrix is formed by including the terms used in all the translations, and each document is allocated a single vector in the matrix no matter how many languages are treated by the methodology. After training, i.e., application of the singular value decomposition, the system can index any new document or query that is presented to it according to a set of derived abstract indexing variables that are language-independent.

The organization and operation of this invention will be better understood from a consideration of the detailed description, which follows, when taken in conjunction with the accompanying drawing.

BRIEF DESCRIPTION OF THE DRAWING

FIG. 3 is a flow diagram depicting the processing which generates the "term" and "document" matrices using singular value decomposition as well as the processing of a user's query.

DETAILED DESCRIPTION

Before discussing the principles and operational characteristics of this invention in detail, it is helpful to present a motivating example of latent semantic indexing for a single language case, namely, English. This also aids in introducing terminology utilized later in the discussion.

Illustrative Example of the LSI Method

The contents of Table 1 are used to illustrate how semantic structure analysis works and to point out the differences between this method and conventional keyword matching.

TABLE 1

Document Set Based on Titles c1: *Human* machine *interface* for Lab ABC *computer* applications c2: A *survey* of *user* opinion of *computer system response time* c3: The *EPS user interface* management *system* c4: *Systems* and *human systems* engineering testing of *EPS*-2 c5: Relation of *user*-perceived *response time* to error measurement m1: The generation of random, binary, unordered *trees* m2: The intersection *graph* of paths in *trees* m3: *Graph minors* IV: Widths of *trees* and well-quasi-ordering m4: *Graph minors*: A *survey*

In this example, a file of text objects consists of nine titles of technical documents with titles c1-c5 concerned with human/computer interaction and titles m1-m4 concerned with mathematical graph theory. In Table 1, words occuring in more than one title are italicized. Using conventional keyword retrieval, if a user requested papers dealing with "*human computer interaction*," titles c1, c2, and c4 would be returned, since these titles contain at least one keyword from the user request. However, c3 and c5, while related to the query, would not be returned since they share no words in common with the request. It is now shown how latent semantic structure analysis treats this request to return titles c3 and c5.

Table 2 depicts the "term-by-document" matrix for the 9 technical document titles. Each cell entry, (i,j), is the frequency of occurrence of term i in document j. This basic term-by-document matrix or a mathematical transformation thereof is used as input to the statistical procedure described below.

TABLE 2

| TERMS | DOCUMENTS | | | | | | | | |
|---|---|---|---|---|---|---|---|---|---|
| | c1 | c2 | c3 | c4 | c5 | m1 | m2 | m3 | m4 |
| 1. human | 1 | 0 | 0 | 1 | 0 | 0 | 0 | 0 | 0 |
| 2. interface | 1 | 0 | 1 | 0 | 0 | 0 | 0 | 0 | 0 |
| 3. computer | 1 | 1 | 0 | 0 | 0 | 0 | 0 | 0 | 0 |
| 4. user | 0 | 1 | 1 | 0 | 1 | 0 | 0 | 0 | 0 |
| 5. system | 0 | 1 | 1 | 2 | 0 | 0 | 0 | 0 | 0 |
| 6. response | 0 | 1 | 0 | 0 | 1 | 0 | 0 | 0 | 0 |
| 7. time | 0 | 1 | 0 | 0 | 1 | 0 | 0 | 0 | 0 |
| 8. EPS | 0 | 0 | 1 | 1 | 0 | 0 | 0 | 0 | 0 |
| 9. survey | 0 | 1 | 0 | 0 | 0 | 0 | 0 | 0 | 1 |
| 10. tree | 0 | 0 | 0 | 0 | 0 | 1 | 1 | 1 | 0 |
| 11. graph | 0 | 0 | 0 | 0 | 0 | 0 | 1 | 1 | 1 |
| 12. minor | 0 | 0 | 0 | 0 | 0 | 0 | 0 | 1 | 1 |

Figure 1:
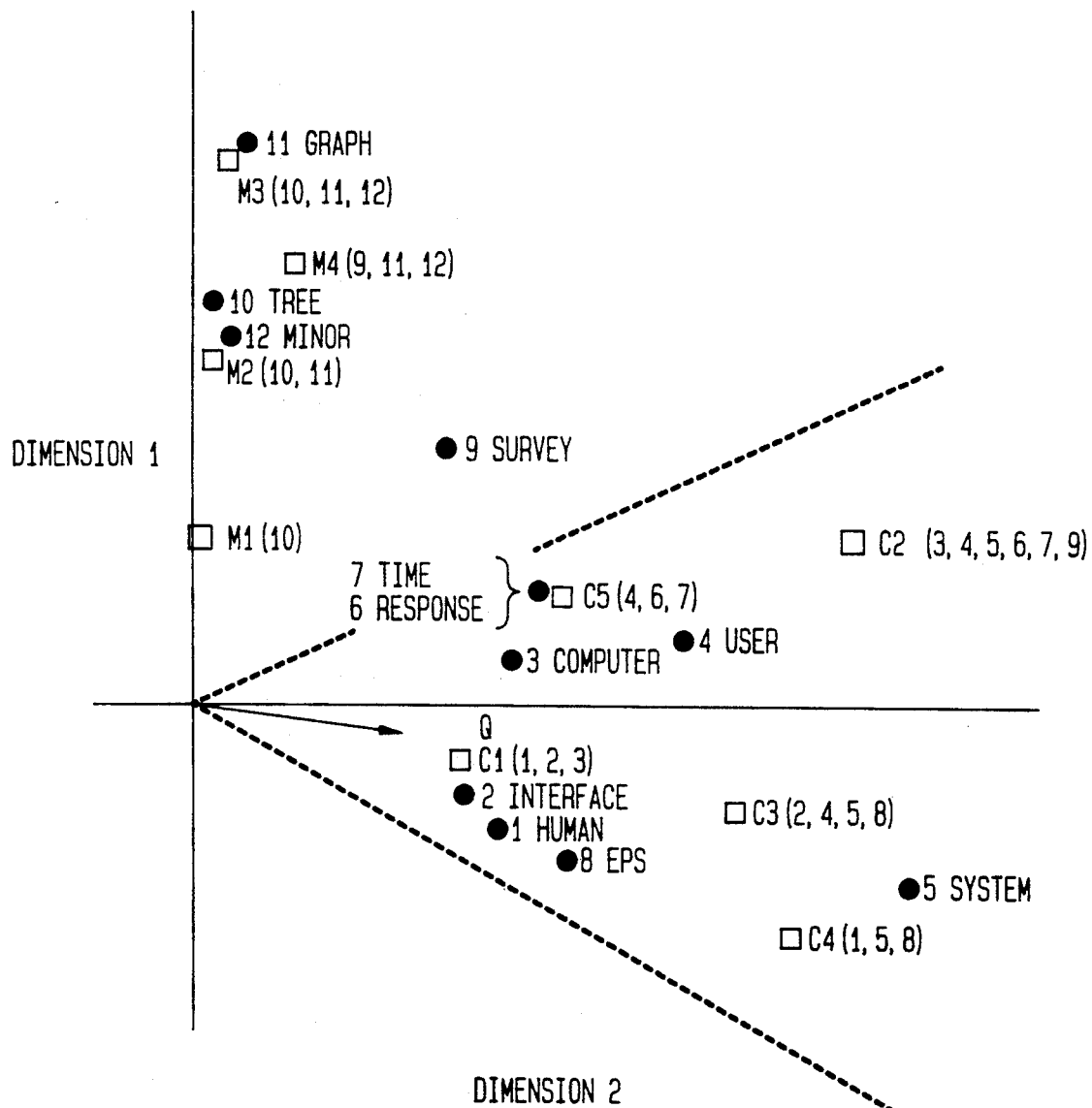
FIG. 1 is a plot of the "term" coordinates and the "document" coordinates based on a two-dimensional singular value decomposition of an original "term-by-document" matrix in a single language.

For this example the documents and terms have been carefully selected to yield a good approximation in just two dimensions for expository purposes. FIG. 1 is a two-dimensional graphical representation of the two largest dimensions resulting from the mathematical process, singular value decomposition. Both document titles and the terms used in them are placed into the same space. Terms are shown as circles and labeled by number. Document titles are represented by squares with the numbers of constituent terms indicated parenthetically. The angle between two objects (terms or documents) describe their computed similarity. In this representation, the two types of documents form two distinct groups: all the mathematical graph theory titles occupy the same region in space (basically along Dimension 1 of FIG. 1) whereas a quite distinct group is formed for human/computer interaction titles (essentially along Dimension 2 of FIG. 1).

To respond to a user query about "*human computer interaction*," the query is first folded into this two-dimensional space using those query terms that occur in the space (namely, "human" and "computer"). The query vector is located in the direction of the weighted average of these constituent terms, and is denoted by a directional arrow labeled "Q" in FIG. 1. A measure of closeness or similarity is the angle between the query vector and any given term or document vector. In FIG. 1 the cosine between the query vector and each c1-c5 titles is greater than 0.90; the angle corresponding to the cosine value of 0.90 with the query is shown by the dashed lines in FIG. 1. With this technique, documents c3 and c5 would be returned as matches to the user query, even though they share no common terms with the query. This is because the latent semantic structure (represented in FIG. 1) fits the overall pattern of term usage across documents.

Description of Singular Value Decomposition

To obtain the data to plot FIG. 1, the "term-by-document" matrix of Table 2 is decomposed using singular value decomposition (SVD). A reduced SVD is employed to approximate the original matrix in terms of a much smaller number of orthogonal dimensions. The reduced dimensional matrices are used for retrieval; these describe major associational structures in the term-document matrix but ignore small variations in word usage. The number of dimensions to represent adequately a particular domain is largely an empirical matter. If the number of dimensions is too large, random noise or variations in word usage will be modeled. If the number of dimensions is too small, significant semantic content will remain uncaptured. For diverse information sources, 100 or more dimensions may be needed.

To illustrate the decomposition technique, the term-by-document matrix, denoted Y, is decomposed into three other matrices, namely, the term matrix (TERM), the document matrix (DOCUMENT), and a diagonal matrix of singular values (DIAGONAL), as follows:

$$Y_{t,d} = TERM_{t,k} DIAGONAL_{k,k} DOCUMENT^T_{k,d}$$

where Y is the original t-by-d matrix, TERM is the t-by-k matrix that has unit-length orthogonal columns, $DOCUMENT^T$ is the transpose of the d-by-k DOCUMENT matrix with unit-length orthogonal columns, and DIAGONAL is the k-by-k diagonal matrix of singular values typically ordered by magnitude.

The dimensionality of the solution, denoted k, is the rank of the t-by-d matrix, that is, $k \leq \min(t,d)$. Tables 3, 4 and 5 below show the TERM and DOCUMENT matrices and the diagonal elements of the DIAGONAL matrix, respectively, as found via SVD.

TABLE 3

| TERM MATRIX (12 terms by 9 dimensions) | | | | | | | | | |
|---|---|---|---|---|---|---|---|---|---|
| human | 0.22 | −0.11 | 0.29 | −0.41 | −0.11 | −0.34 | −.52 | −0.06 | −0.41 |
| interface | 0.20 | −0.07 | 0.14 | −0.55 | 0.28 | 0.50 | −0.07 | −0.01 | −0.11 |
| computer | 0.24 | 0.04 | −0.16 | −0.59 | −0.11 | −0.25 | −0.30 | 0.06 | 0.49 |
| user | 0.40 | 0.06 | −0.34 | 0.10 | 0.33 | 0.38 | 0.00 | 0.00 | 0.01 |
| system | 0.64 | −0.17 | 0.36 | 0.33 | −0.16 | −0.21 | −0.16 | 0.03 | 0.27 |
| response | 0.26 | 0.11 | −0.42 | 0.07 | 0.08 | −0.17 | 0.28 | −0.02 | −0.05 |
| time | 0.26 | 0.11 | −0.42 | 0.07 | 0.08 | −0.17 | 0.28 | −0.02 | −0.05 |
| EPS | 0.30 | −0.14 | 0.33 | 0.19 | 0.11 | 0.27 | 0.03 | −0.02 | −0.16 |
| survey | 0.20 | 0.27 | −0.18 | −0.03 | −0.54 | 0.08 | −0.47 | −0.04 | −0.58 |
| tree | 0.01 | 0.49 | 0.23 | 0.02 | 0.59 | −0.39 | −0.29 | 0.25 | −0.22 |
| graph | 0.04 | 0.62 | 0.22 | 0.00 | −0.07 | 0.11 | 0.16 | −0.68 | 0.23 |
| minor | 0.03 | 0.45 | 0.14 | −0.01 | −0.30 | 0.28 | 0.34 | 0.68 | 0.18 |

TABLE 4

| DOCUMENT MATRIX (9 documents by 9 dimensions) | | | | | | | | | |
|---|---|---|---|---|---|---|---|---|---|
| c1 | 0.20 | −0.06 | 0.11 | −0.95 | 0.04 | −0.08 | 0.18 | −0.01 | −0.06 |
| c2 | 0.60 | 0.16 | −0.50 | −0.03 | −0.21 | −0.02 | −0.43 | 0.05 | 0.24 |
| c3 | 0.46 | −0.13 | 0.21 | 0.04 | 0.38 | 0.07 | −0.24 | 0.01 | 0.02 |
| c4 | 0.54 | −0.23 | 0.57 | 0.27 | −0.20 | −0.04 | 0.26 | −0.02 | −0.08 |
| c5 | 0.28 | 0.11 | −0.50 | 0.15 | 0.33 | 0.03 | 0.67 | −0.06 | −0.26 |
| m1 | 0.00 | 0.19 | 0.10 | 0.02 | 0.39 | −0.30 | −0.34 | 0.45 | −0.62 |
| m2 | 0.01 | 0.44 | 0.19 | 0.02 | 0.35 | −0.21 | −0.15 | −0.76 | 0.02 |
| m3 | 0.02 | 0.62 | 0.25 | 0.01 | 0.15 | 0.00 | 0.25 | 0.45 | 0.52 |
| m4 | 0.08 | 0.53 | 0.08 | −0.02 | −0.60 | 0.36 | 0.04 | −0.07 | −0.45 |

TABLE 5

| DIAGONAL (9 singular values) | | | | | | | | |
|---|---|---|---|---|---|---|---|---|
| 3.34 | 2.54 | 2.35 | 1.64 | 1.50 | 1.31 | 0.84 | 0.56 | 0.36 |

As alluded to earlier, data to plot FIG. 1 was obtained by presuming that two dimensions are sufficient to capture the major associational structure of the t-by-d matrix, that is, k is set to two in the expression for $Y_{t,d}$, yielding an approximation of the original matrix. Only the first two columns of the TERM and DOCUMENT matrices are considered with the remaining columns being ignored. Thus, the term data point corresponding to "human" in FIG. 1 is plotted with coordinates (0.22, −0.11), which are extracted from the first row and the two left-most columns of the TERM matrix. Similarly, the document data point corresponding to title m1 has coordinates (0.00, 0.19), coming from row six and the two left-most columns of the DOCUMENT matrix. Finally, the Q vector is located from the weighted average of the terms "human" and "computer" appearing in the query. A method to compute the weighted average will be presented below.

General Model Details

It is now elucidating to describe in somewhat more detail the mathematical model underlying the latent structure, singular value decomposition technique.

Any rectangular matrix Y of t rows and d columns, for example, a t-by-d matrix of terms and documents, can be decomposed into a product of three other matrices:

$$Y = T_o S_o D^T_o \qquad (1)$$

such that $T_o$ and $D_o$ have unit-length orthogonal columns (i.e. $T_o^T T_o = I$; $D_o^T D_o = I$) and $S_o$ is diagonal. This is called the singular value decomposition (SVD) of Y. (A procedure for SVD is described in the text *Numerical Recipes*, by Press, Flannery, Teukolsky and Vetterling, 1986, Cambridge University Press, Cambridge, England). $T_o$ and $D_o$ are the matrices of left and right singular vectors and $S_o$ is the diagonal matrix of singular values. By convention, the diagonal elements of $S_o$ are ordered in decreasing magnitude.

With SVD, it is possible to devise a simple strategy for an optimal approximation to Y using smaller matrices. The k largest singular values and their associated columns in $T_o$ and $D_o$ may be kept and the remaining entries set to zero. The product of the resulting matrices is a matrix $Y_R$ which is approximately equal to Y, and is of rank k. The new matrix $Y_R$ is the matrix of rank k which is the closest in the least squares sense to Y. Since zeros were introduced into $S_o$, the representation of $S_o$ can be simplified by deleting the rows and columns having these zeros to obtain a new diagonal matrix S, and then deleting the corresponding columns of $T_o$ and $D_o$ to define new matrices T and D, respectively. The result is a reduced model such that $$Y_R = TSD^T \qquad (2)$$

The value of k is chosen for each application; it is generally such that $k \geq 100$ for collections of 1000-3000 data objects.

For discussion purposes, it is useful to interpret the SVD geometrically. The rows of the reduced matrices T and D may be taken as vectors representing the terms and documents, respectively, in a k-dimensional space. With appropriate rescaling of the axes, by quantities related to the associated diagonal values of S, dot products between points in the space can be used to access and compare objects. (A simplified approach which did not involve rescaling was used to plot the data of FIG. 1, but this was strictly for expository purposes.) These techniques are now discussed.

Fundamental Comparisons

There are basically three types of comparisons of interest: (i) those comparing two terms; (ii) those comparing two documents or text objects; and (iii) those comparing a term and a document or text object. As used throughout, the notion of a text object or data object is general whereas a document is a specific instance of a text object or data object. Also, text or data objects are stored in the computer system in files.

Two Terms: In the data, the dot product between two row vectors of $Y_R$ tells the extent to which two terms have a similar pattern of occurrence across the set of documents. The matrix $Y_R Y^T_R$ is the square symmetric matrix approximation containing all the term-by-term dot products. Using equation (2), $$Y_R Y^T_R = (TSD^T)(TSD^T)^T = TS^2T^T = (TS)(TS)^T. \quad (3)$$

This means that the dot product between the i-th row and j-th row of $Y_R$ can be obtained by calculating the dot product between the i-th and j-th rows of the TS matrix. That is, considering the rows of TS as vectors representing the terms, dot products between these vectors give the comparison between the terms. The relation between taking the rows of T as vectors and those of TS as vectors is simple since S is a diagonal matrix; each vector element has been stretched or shrunk by the corresponding element of S.

Two Documents: In this case, the dot product is between two column vectors of Y. The document-to-document dot product is approximated by $$Y^T_R Y_R = (TSD^T)^T(TSD^T) = DS^2 D^T = (DS)(DS)^T. \quad (4)$$

Thus the rows of the DS matrix are taken as vectors representing the documents, and the comparison is via the dot product between the rows of the DS matrix.

Term and Document: This comparison is somewhat different. Instead of trying to estimate the dot product between rows or between columns of Y, the fundamental comparison between a term and a document is the value of an individual cell in Y. The approximation of Y is simply equation (2), i.e., $Y_R = TSD^T$. The i,j cell of $Y_R$ may therefore be obtained by taking the dot product between the i-th row of the matrix $TS^{\frac{1}{2}}$ and the j-th row of the matrix $DS^{\frac{1}{2}}$. While the "within" (term or document) comparisons involved using rows of TS and DS as vectors, the "between" comparison requires $TS^{\frac{1}{2}}$ and $DS^{\frac{1}{2}}$ for coordinates. Thus it is not possible to make a single configuration of points in a space that will allow both "between" and "within" comparisons. They will be similar, however, differing only by a stretching or shrinking of the dimensional elements by a factor $S^{\frac{1}{2}}$.

Representations of Pseudo-Objects

The previous results show how it is possible to compute comparisons between the various objects associated with the rows or columns of Y. It is very important in information retrieval applications to compute similar comparison quantities for objects such as queries that do not appear explicitly in Y. This is particularly important for the cross-language case considered in accordance with the present invention. For example, it is necessary to be able to take a completely novel query, find a location in the k-dimensional latent semantic space for it, and then evaluate its cosine with respect to terms or objects in the space. Another example would be trying, after-the-fact, to find representations for documents that did not appear in the original space. The new objects for both these examples are equivalent to objects in the matrix Y in that they may be represented as vectors of terms. For this reason they are called pseudo-documents specifically or pseudo-objects generically. In order to compare pseudo-documents to other documents, the starting point is defining a pseudo-document vector, designated $Y_q$. Then a representation $D_q$ is derived such that $D_q$ can be used just like a row of D in the comparison relationships described in the foregoing sections. One criterion for such a derivation is that the insertion of a real document $Y_i$ should give $D_i$ when the model is ideal (i.e., $Y = Y_R$). With this constraint, $$Y_q = TSD_q^T$$

or, since $T^T T$ equals the identity matrix, $$D_q^T = S^{-1}T^T Y_q$$

or, finally, $$D_q = Y_q^T T S^{-1}. \quad (5)$$

Thus, with appropriate rescaling of the axes, this amounts to placing the pseudo-object at the vector sum of its corresponding term points. The $D_q$ may be used like any row of D and, appropriately scaled by S or $S^{\frac{1}{2}}$, can be used like a usual document vector for making "within" and "between" comparisons. [It is to be noted that if the measure of similarity to be used in comparing the query against all the documents is one in which only the angle between the vectors is important (such as the cosine), there is no difference for comparison purposes between placing the query at the vector average or the vector sum of its terms since the average and sum differ only in magnitude.]

For the query example above ("human computer interaction"), $Y_q = [1 0 1 0 \ldots]^T$, so for the simplified two-dimensional representation, $$r = 1 \cdot \frac{2\lambda}{k \pi \sin(\theta_1/2)} \quad (1)$$

or, finally, $$D_q = [0.14 - 0.03].$$

Thus, $D_q$ represents the location of the query in the document space and is basically the weighted average of the terms appearing in the query.

MULTI-LANGUAGE CASE

To extend the principles of LSI to cross-language retrieval, a document set comprising all documents of interest, in the languages to be searched, is formed. A subset of the documents, called the "training set," is selected; the "training set" is composed of documents for which translations exist in all the languages (two or more). The so-called "joint" term-by-document matrix of this set is composed from the addition of the terms in their renditions in all the languages. This joint matrix differs from the single-language LSI matrix in that each column, which represents a single multi-language document, is the combination of terms from the two (or more) languages coalesced into just a single column vector. As with the single-language technique, the joint matrix is then analyzed by singular value decomposition. The resulting representation defines vectors for the training-set terms and documents in the languages under consideration. Once the training analysis has been completed, other single-language documents can be "folded in" as pseudo-documents on the basis of terms from any one of the original languages alone. Most importantly, a user query is treated as such a new document.

In the derived indexing space there is a point representing each term in the training set. A new single-language document is assigned a point in the same space by putting it at an appropriate average of the location of all the terms it contains. For cross-language retrieval, the same number or greater of dimensions are kept as would be required to represent the collection in a single language. As outlined above, full or partial equivalence (in the sense that one term will have the same or similar effect in referencing documents as another) is induced between any two or more terms approximately to the extent that their pattern of use, or the overall pattern of association between other terms with which they co-occur, is similar across documents in the training set. Equivalent or nearly equivalent terms in different languages would, of course, be expected to be distributed in nearly the same way in a set of documents and their translations. Thus, the location of two or more equivalent terms in different languages should be almost the same in the resulting representation. Consequently, a document folded in by terms in one language is retrieved by a query containing the appropriate set of words in another language.

A simple example may aid in understanding the general procedure. For this example, a training set of "documents" is composed of four titles, each of which is stated in both English and French.

Training Doc. T1. Effect of falling oil prices on small companies. *Les consequences de la chute des prix du petrole pour les petites compagnies.*

Training Doc. T2. Low oil prices—Effect on Calgary. *La baisse des prix petroliers—Les consequences pour les citoyens de Calgary.*

Training Doc. T3. Canadian nuclear power stations—Safety precautions. *Les reacteurs nucleaires canadiens—Les precautions prises pour en assurer la securite.*

Training Doc. T4. Safety standards for nuclear power plants—Swedish call for international conference. *Les normes de securite en matiere de centrales nucleaires—L'appel de la Suede en faveur d'une conference internationale.*

First the 55 (20 English-only, 32 French-only, and 3 both) joint term-by-four document training matrix formed from these "documents" is constructed, as partially depicted in TABLE 6; this table shows the first six English-only words, the three words shared by both languages, and the the last three French-only words. It is this joint matrix that will be decomposed by SVD.

TABLE 6

| TERMS | DOCUMENTS | | | |
|---|---|---|---|---|
| | T1(e1, f1) | T2(e2, f2) | T3(e3, f3) | T4(e4, f4) |
| effect | 1 | 1 | 0 | 0 |
| of | 1 | 0 | 0 | 0 |
| falling | 1 | 0 | 0 | 0 |
| oil | 1 | 1 | 0 | 0 |
| prices | 1 | 1 | 0 | 0 |
| on | 1 | 1 | 0 | 0 |
| Calgary | 0 | 2 | 0 | 0 |
| precautions | 0 | 0 | 2 | 0 |
| conference | 0 | 0 | 0 | 2 |
| d | 0 | 0 | 0 | 1 |
| une | 0 | 0 | 0 | 1 |
| internationale | 0 | 0 | 0 | 1 |

As is apparent from the joint term-by-document training matrix of Table 6, each document is composed of all the terms in both French and English, i.e. the addition of terms from each document including its translation(s). For instance, since the term *precautions* appears as the same term in both the English and French versions, there is an entry of "2" under title T3 in the *precautions* row. As suggested by the foregoing illustrative example, the general procedure for formulating the *joint* term-by-document matrix for the multi-language case is as follows:

(1) for each document in the training set written in an original language, translate this document into all the other languages. (In the above example, each of the four training documents is in English, which is considered the original language, and each is translated to one other language, namely, French);

(2) each original document plus all of the other translations of each original document are parsed to extract distinct terms composing the multi-language documents. These terms define a database designated the lexicon database, and this database is stored in a memory of a computer. The lexicon database is used in constructing the general joint term-by-document matrix as presented below. (In the above example, the first document contained eight (8) distinct English terms and twelve (12) distinct French terms—"les" is repeated; the second document contains only two (2) more distinct English terms not contained in the first English document, namely, "low" and "Calgary". The terms "oil", "prices", "effect", and "on" are already in the lexicon database as a result of parsing the first English document. Continued parsing in this manner results in the fifty-five (55) distinct terms presented above, namely, 20 English-only, 32 French-only and 3 terms common to both languages.)

(3) the distinct terms from the lexicon database are then treated as being listed in a column, such as the TERMS column in TABLE 6, as an aid in preparing the joint term-by-document matrix; this column contains t rows. Each training document, composed of both the original as well as all translations, is assigned one column in the joint matrix; if there are d training documents, then there are d columns. Any (i,j) cell in the joint term-by-document matrix, that is, the intersection of the $i^{th}$ "term" row with the $j^{th}$ "document" column contains a tabulation of the frequency of occurrence of the term in the $i^{th}$ row with the document assigned to the $j^{th}$ column. (In the example, training document T2 is shown to have a tabulation of 1 in the row with the term "effect" since it appears only once in the coalesced or merged English and French versions of the document. In contrast, there is an entry of 2 in the row with the term "Calgary" since it appears twice in the documents of T2, namely, once in the English document and once in the French document.)

It is important to understand that it is not necessary to use all available documents to compose the training set. One useful test for the number of documents to include in the training set is the satisfactory retrieval of a document written in one language as determined by inputing the terms of the document as a query in another language. One illustrative test for the sufficiency of the training set will be presented below after the joint term-by-document matrix is decomposed. Also, it is important to realize that some retrieval situations will not require assigning all terms obtained during the parsing step to the lexicon database. A test of what terms to assign to the database is again the satisfactory retrieval of a document written in one language as determined by inputing the terms of the document as a query in another language.

By way of terminology, the generalization of a 'document' is called a 'data object' so as to cover applications such as graphics-type information as well as text. Moreover, the coalesced version of all translations of a data object as well as the original data object is called a merged data object.

The results of the decomposition are shown in Tables 7, 8, and 9 (which are similar to Tables 3, 4, and 5) for two dimensions.

TABLE 7

| TERM MATRIX (55 terms by 2 dimensions) | | |
|---|---|---|
| effect | 0.0039 | −0.1962 |
| of | 0.0042 | −0.2550 |
| falling | 0.0042 | −0.2550 |
| oil | 0.0039 | −0.1962 |
| prices | 0.0039 | −0.1962 |
| on | 0.0039 | −0.1962 |
| Calgary | 0.0056 | −0.2178 |
| precautions | 0.0451 | −0.0036 |
| conference | 0.3299 | 0.0124 |
| d | 0.2081 | 0.0078 |
| une | 0.2081 | 0.0078 |
| internationale | 0.2081 | 0.0078 |

TABLE 8

| DOCUMENT MATRIX (4 documents by 2 dimensions) | | |
|---|---|---|
| T1 | 0.0200 | −0.8799 |
| T2 | 0.0169 | −0.4743 |
| T3 | 0.1355 | −0.0079 |
| T4 | 0.9904 | 0.0269 |

TABLE 9

| DIAGONAL (2 singular values) | |
|---|---|
| 3.2986 | 2.3920 |

Figure 2:
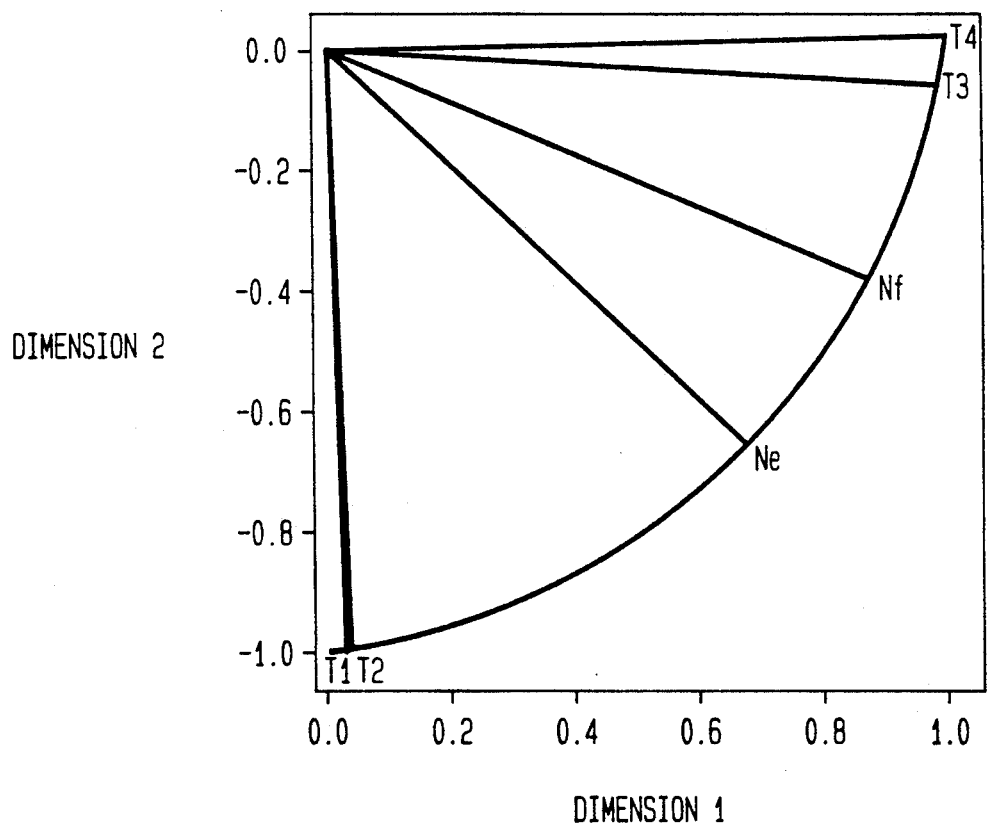
FIG. 2 shows the location of the training documents in the data object space for an example reduced to two dimensions in a dual language example.

FIG. 2 shows the location of the four training documents in this space. (Since the angle of the coordinates representative of each document is the important parameter for search purposes and the absolute magnitude of the coordinates of each document is relatively unimportant for search purposes, the magnitude of each document has been normalized to unit magnitude for clarity of presentation).

Next, all single-language documents are folded into the space derived from the training set. Each remaining document is folded into the resulting space separately in its English and French versions, i.e. using only English terms and then only French terms in the pseudo-document representation of equation (5); for instance, New Doc Ne. Ontario—Premier's rejection of further nuclear power plants.
(Absolute coordinates of 0.0695, −0.0708)
New Doc Nf. *L'ontario—le refus du premier ministre de favoriser la construction d'autres centrales nucleaires.*
(Absolute coordinates of 0.1533, −0.0775)

As shown, the English-only and French-only versions, Ne and Nf, end up close ("similar") to one another and well separated from the other text items in the space. In fact, for a search angle of approximately plus/minus 26 degrees (cosine of 0.90), each document falls within the angle of similarity of the other document. The degree of similarity or closeness of corresponding documents folded into the semantic space after training is used as a test for the sufficiency of the set of data objects selected to train the semantic space. For instance, after training, if a set of documents like Ne and Nf does not fall within a preselected angle of similarity, then it may be necessary to re-train the semantic space in order to meet the prescribed retrieval criterion/criteria—for the illustrative case, a single criterion is falling within the angle of search. Typically, paragraphs of 50 words or more from 500 or more multi-language documents are suitable to train the semantic space.

Of course, it is possible to have considered the folded in documents from another viewpoint, namely: one might have been an untranslated document entered in one language into the indexing space for later reference, and the other an untranslated query in another language. Indeed, the latter viewpoint is the intended manner of use, and a query in one language would locate the translated version of the document.

Having defined a cross-language indexing space on the basis of an initial sample of multi-lingual documents, new documents would be entered without translation, using words from their original language only. Similarly, queries would be entered in whatever language they are posed by the user. The cross-language indesing space will make it possible to match a query in any language with a document in any language.

For the trans-language case discussed here, if it were assumed that the only difference between the two language versions was the orthography of individual words, i.e. that a word-for-word correspondence between languages existed for the collection in question, then it would be clear that the same number of dimensions would be optimal for the joint representation as for any one of the languages alone. The dimension reduction would thus implicitly include a factor of 1 reduction for the number 1 of languages involved. The expected result would be that differences between languages would be perfectly collapsed in the resulting representation; a term in any language would map to the identical vector value to any of its exact translations. Of course, languages do not translate perfectly by one to one word substitution, so the true optimum number of dimensions for a joint representation might be somewhat larger (or perhaps smaller) than for each single language, in order, for example, to capture important structure special to each language separately. It has been found that the k for the single language case has been provided acceptable performance for the multi-language case.

Preprocessing and Normalization

The equations given above are independent of any preprocessing or reweighting of the rows or columns of Y. Such preprocessing might be used to prevent documents of different overall length from having differential effect on the model, or be used to impose preconceptions of which terms are more important.

Illustrative Embodiment

The foundation principles presented in the foregoing sections are now described in a process flow manner by way of teaching an illustrative embodiment in accordance with the present invention.

The technique for processing the documents and their corresponding translations is shown in block diagram form in FIG. 3. The first processing phase, as represented by blocks 100–150, is that of training the system. Initially, as represented by block 100, the set of training documents is selected.

The next processing activity of the training phase, as illustrated by processing block 110, is that of preprocessing the training set.

The next step to the processing is represented by block 120 in FIG. 3. Based upon the earlier text preprocessing, a system lexicon of terms is created. Such a processing step is accomplished, for example, by parsing the data objects to obtain selected terms, such as all nouns, verbs, adjectives, and so forth.

From the list of lexicon terms, the Joint Term-by-Document matrix is created, as depicted by processing block 130 in FIG. 3.

The next step performed in the training phase is the singular value decomposition on the Joint Term-by-Document matrix, as depicted by processing block 140. This analysis is only effected once (or each time there is a significant update in the storage files).

The final processing step in the training phase is the generation of the term database, as depicted by block 150.

The fold-in phase is represented by blocks 160–190. All single-language documents are preprocessed in the same manner as block 110, that is, terms are isolated and reduced to lowercase; this is depicted by processing block 160.

Next, as depicted by processing block 170, terms from each single language document are located in the terms-database.

Following this processing, processing block 180 is invoked to compute the spatial coordinates of each single language document as per equation (5).

Finally, the total document database, including the training documents, is constructed via processing of block 190.

The user query processing activity is depicted on the right-most side of FIG. 3. The first step, as represented by processing block 200, is to preprocess the query in the same way as the original documents.

As then depicted by block 210, for each query term also contained in the system lexicon, the k-dimensional vector is constructed.

Processing block 220 depicts processing of the query vector using equation (5).

The next step in the query processing is depicted by processing block 230. In order that the best matching document is located, the query vector is compared to all documents in the space. The similarity metric used is the cosine or dot product between the query vector and the document vectors. (The cosine metric is similar to a dot product measure except that it ignores the magnitude of the vectors and simply uses the angle between the vectors being compared.) A cosine of 1.0 would indicate that the query vector and the document vector were on top of one another in the space. Typically an angle having a cosine of at least 0.90 is considered a good match.

The cosines are sorted, as depicted by processing block 240. Finally, as shown in block 250, the documents within the angle defined by the desired cosine paramenter are stored for later recall by the user with the option of displaying a subset of the requested documents.

It is to be further understood that the methodology described herein is not limited to the specific forms disclosed by way of illustration, but may assume other embodiments limited only by the scope of the appended claims.

What is claimed is:

1. A multi-language information retrieval method for operating a computer system, including an information file of stored data objects, to retrieve selected data objects based on a user query, the method comprising the steps of selecting a set of training data objects from the stored data objects, said set of training data objects selected to satisfy predetermined retrieval criteria, translating each of said data objects in said set of training data objects into multiple languages to produce multiple translations and to generate a set of multi-language training data objects corresponding to said set of training data objects, and storing said translations corresponding to each of said multi-language training data objects in the information file, for each of said multi-language training data objects, merging all of said translations into a single merged data object composed of terms contained in all of said translations, thereby generating a set of merged data objects corresponding to said set of multi-language training data objects, parsing each said merged data object to extract distinct ones of said terms and generating a lexicon database from said distinct terms, generating a joint term-by-data object matrix by processing said translations as stored in the information file, wherein said matrix has t rows in correspondence to said distinct terms in said lexicon database and d columns in correspondence to the number of said merged data objects in said set of merged data objects, and wherein each (i,j) cell of said matrix registers a tabulation of the occurrence of the $i^{th}$ distinct term in the $j^{th}$ merged data object, decomposing said matrix into a reduced singular value representation composed of a distinct term file and a data object file to create a semantic space, generating a pseudo-object, in response to the user query, by parsing the user query to obtain query terms and applying a given mathematical algorithm to said distinct terms and said query terms, and inserting said pseudo-object into said semantic space, examining the similarity between said pseudo-object and the stored data objects in said semantic space to generate the selected data objects corresponding to said pseudo-object, and generating a report of the selected data objects.

2. The method as recited in claim 1 further including, after the step of decomposing, the step of folding in, as other pseudo-objects, other data objects excluded from said set of training data objects by parsing each of said other data objects to obtain data object query terms and applying a given mathematical formula to said data object query terms and said distinct terms to create an augmented semantic space to serve as said semantic space.

3. The method as recited in claim 2 wherein said matrix is expressed as Y, said step of decomposing produces said representation in the form $Y = T_o S_o D^T_o$ of rank m, and an approximation representation $Y_R = TSD^T$ of rank $k < m$, where $T_o$ and $D_o$ represent said term and data object files and $S_o$ corresponds to said singular value representation and where T, D and S represent reduced forms of $T_o$, $D_o$ and $S_o$, respectively, each of said other pseudo-objects is expressible as $Y_q$ and said step of folding in includes the step of computing $D_q = Y_q^T TS^{-1}$ for each of said other pseudo-objects, said user-query pseudo-object is expressible as $Y_q$ and said step of inserting includes the step of computing $D_q = Y_q^T TS^{-1}$, and said step of examining includes the step of evaluating the dot products between said user-query pseudo-object and the data objects in said augmented semantic space.

4. The method as recited in claim 3 wherein the degree of similarity is measured by said dot products exceeding a predetermined threshold.

5. The method as recited in claim 4 wherein said approximation representation is obtained by setting $(k+1)$ through m diagonal values of $S_o$ to zero.

6. The method as recited in claim 2 wherein said matrix is expressed as Y, said step of decomposing produces said representation in the form $Y = T_o S_o D^T_o$ of rank m, and an approximation representation $Y_R = TSD^T$ of rank $k < m$, where $T_o$ and $D_o$ represent said term and data object files and $S_o$ corresponds to said singular value representation and where T, D and S represent reduced forms of $T_o$, $D_o$ and $S_o$, respectively, each of said other pseudo-objects is expressible as $Y_q$ and said step of folding in includes the step of computing $D_q = Y_q^T TS^{-1}$ for each of said other pseudo-objects, said user-query pseudo-object is expressible as $Y_q$ and said step of inserting includes the step of computing $D_q = Y_q^T TS^{-1}$ for said user-query pseudo-object, and said step of examining includes the step of evaluating the cosines between said user-query pseudo-object and the data objects in said augmented semantic space.

7. A method for retrieving information from a multi-language information file stored in a computer system based on a user query, the file including stored data objects, the method comprising the steps of selecting a set of training data objects from the stored data objects, said set of training data objects selected to satisfy predetermined retrieval criteria, translating each of said data objects in said set of training data objects into multiple languages to produce multiple translations and to generate a set of multi-language training data objects corresponding to said set of training data objects, and storing said translations corresponding to each of said multi-language training data objects in the information file, for each of said multi-language training data objects, merging all of said translations into a single merged data object composed of terms contained in all of said translations, thereby generating a set of merged data objects corresponding to said set of multi-language training data objects, parsing each said merged data object to extract distinct ones of said terms and generating a lexicon database from said distinct terms, generating a joint term-by-data object matrix by processing said translations as stored in the information file, wherein said matrix has t rows in correspondence to said distinct terms in said lexicon database and d columns in correspondence to the number of said merged data objects in said set of merged data objects, and wherein each (i,j) cell of said matrix registers a tabulation of the occurrence of the $i^{th}$ distinct term in the $j^{th}$ merged data object, decomposing said matrix into a reduced singular value representation composed of a distinct term file and a data object file to create a semantic space, folding into said semantic space other data objects excluded from said set of training data objects by parsing each of said other data objects to obtain data object query terms and applying a mathematical transformation to said data object query terms and said distinct terms to create an augmented semantic space to serve as said semantic space, generating a pseudo-object, in response to the user query, by parsing the user query to obtain query terms and applying a given mathematical algorithm to said distinct terms and said query terms, and inserting said pseudo-object into said augmented semantic space, examining the similarity between said pseudo-object and the stored data objects in said augmented semantic space to generate the selected data objects corresponding to said pseudo-object, and generating a report of the selected data objects.

8. A multi-language information retrieval method for operating a computer system, including an information file of stored data objects, to retrieve selected data objects based on a user query, the method comprising the steps of selecting a set of training data objects from the stored data objects, said set of training data objects selected to satisfy predetermined retrieval criteria, translating each of said data objects in said set of training data objects into multiple languages to produce multiple translations and to generate a set of multi-language training data objects corresponding to said translations corresponding to each of said training data objects, and storing said set of multi-language training data objects in the information file, for each of said multi-language training data objects, merging all of said translations into a single merged data object composed of terms contained in all of said translations, thereby generating a set of merged data objects corresponding to said set of multi-language training data objects, parsing each said merged data object to extract distinct ones of said terms and generating a lexicon database from said distinct terms, generating a joint term-by-data object matrix by processing said translations as stored in the information file, wherein said matrix has t rows in correspondence to said distinct terms in said lexicon database and d columns in correspondence to the number of said merged data objects in said set of merged data objects, and wherein each (i,j) cell of said matrix registers a tabulation of the occurrence of the $i^{th}$ distinct term in the $j^{th}$ merged data object, decomposing said matrix into a reduced singular value representation composed of a distinct term file and a data object file to create a semantic space, generating a pseudo-object, in response to the user query, by parsing the user query to obtain query terms and applying a given mathematical algorithm to said distinct terms and said query terms, and inserting said pseudo-object into said semantic space, examining the similarity between said pseudo-object and the stored data objects in said semantic space to generate the selected data objects corresponding to said pseudo-object, processing the selected data objects to produce a coded representation of the selected data objects and storing said coded representation in the computer system in a form accessible by the user for later recall so that the user query requires no repetition, and generating a report of the selected data objects.

* * * * *